(No Model.)
C. B. DEAN.
DENTAL FORCEPS.
No. 421,250.
Patented Feb. 11, 1890.
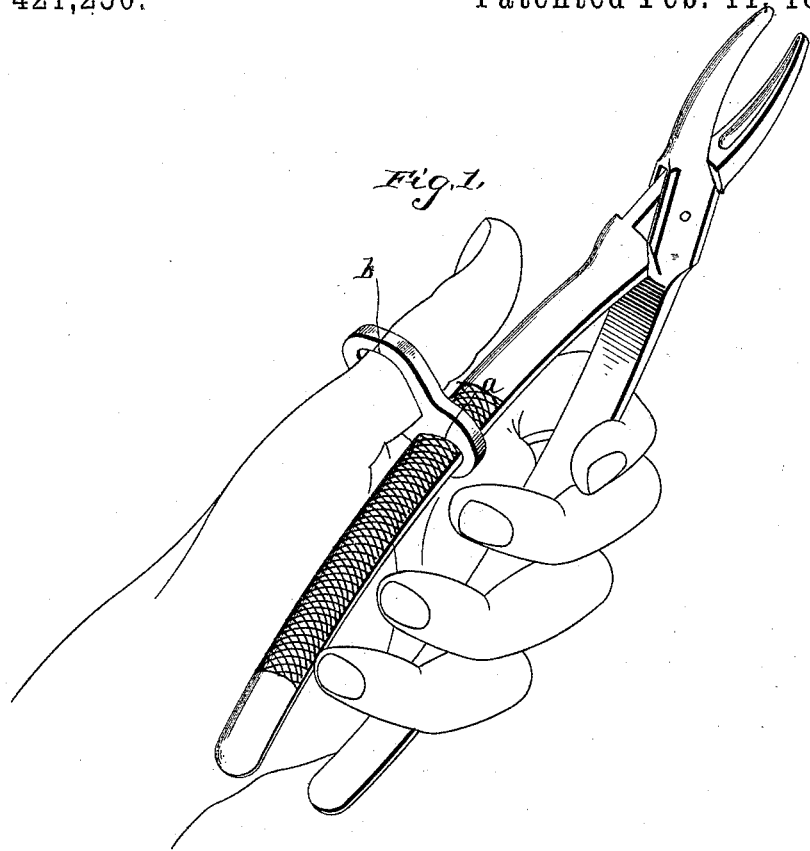
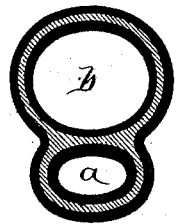
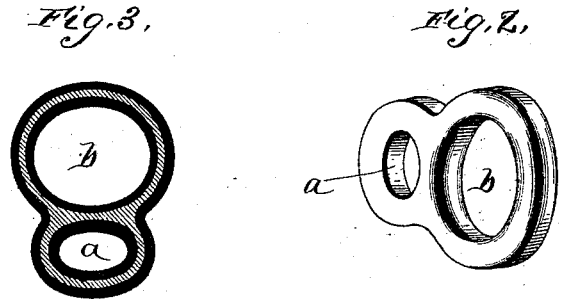
Witnesses
Inventor:
Carter B. Dean,
By his Attorneys
Higdon & Higdon

UNITED STATES PATENT OFFICE.

CARTER B. DEAN, OF NORBORNE, MISSOURI.

DENTAL FORCEPS.

SPECIFICATION forming part of Letters Patent No. 421,250, dated February 11, 1890.

Application filed July 8, 1889. Serial No. 316,776. (No model.)

*To all whom it may concern:*

Be it known that I, CARTER B. DEAN, of Norborne, Carroll county, Missouri, have invented certain new and useful Improvements in Attachments for Dental Forceps, &c., of which the following is a full, clear, and exact description, reference being had to the accompanying drawings, forming a part hereof.

My invention relates to an improvement in links for dental forceps and other similar implements; and it consists in a link having a small loop for the reception of one arm or lever of the forceps and a larger loop for the insertion of the thumb of the operator, the object of my invention being to provide a device which is adapted to facilitate the manipulation of the forceps, as will be more fully set forth hereinafter.

In the accompanying drawings, Figure 1 is a perspective view showing my improved link attached to a forceps and illustrating the mode of using the same. Fig. 2 is a detail perspective view of my improved link. Fig. 3 is a sectional view of the same.

My improved link is substantially in the form of the figure 8, and has a relatively small loop $a$ at its lower end, designed to be slipped on the upper arm of the forceps, and a larger loop $b$, through which the thumb of the operator may be inserted, as shown in Fig. 1. The loop $a$ is sufficiently large to enable the link to slip freely on the arm of the forceps to accommodate itself to any position of the hand. It will be apparent that the link leaves all the fingers free to grasp one arm of the forceps and connects the thumb to the other arm thereof, and thus enables the operator to open the forceps without altering the relative position of either fingers or thumb on the forceps, it being only necessary to move the thumb outward from the fingers, as will be readily understood.

My improved link is particularly designed for use with dental forceps, and will greatly facilitate the operation of drawing teeth. My link is, however, also adapted for use with pliers and pinchers.

I make my improved link of rubber which is only partly vulcanized or other suitable material. In this manner the link is rendered sufficiently strong for its purposes, and at the same time is rendered somewhat elastic and tenacious to adapt the link to retain itself in position on the forceps and thumb when at the desired adjustment.

Having thus described my invention, I claim—

The 8-shaped link for forceps, comprising two rigidly-connected loops, substantially as set forth.

In testimony whereof I affix my signature in presence of two witnesses.

CARTER B. DEAN.

Witnesses:
 J. W. HIGGINBOTTOM,
 ROBERT W. PALMER.